Sept. 3, 1968 R. T. KRUMTINGER 3,399,577
TRANSMISSION SHIFT INDICATOR
Filed Jan. 12, 1967
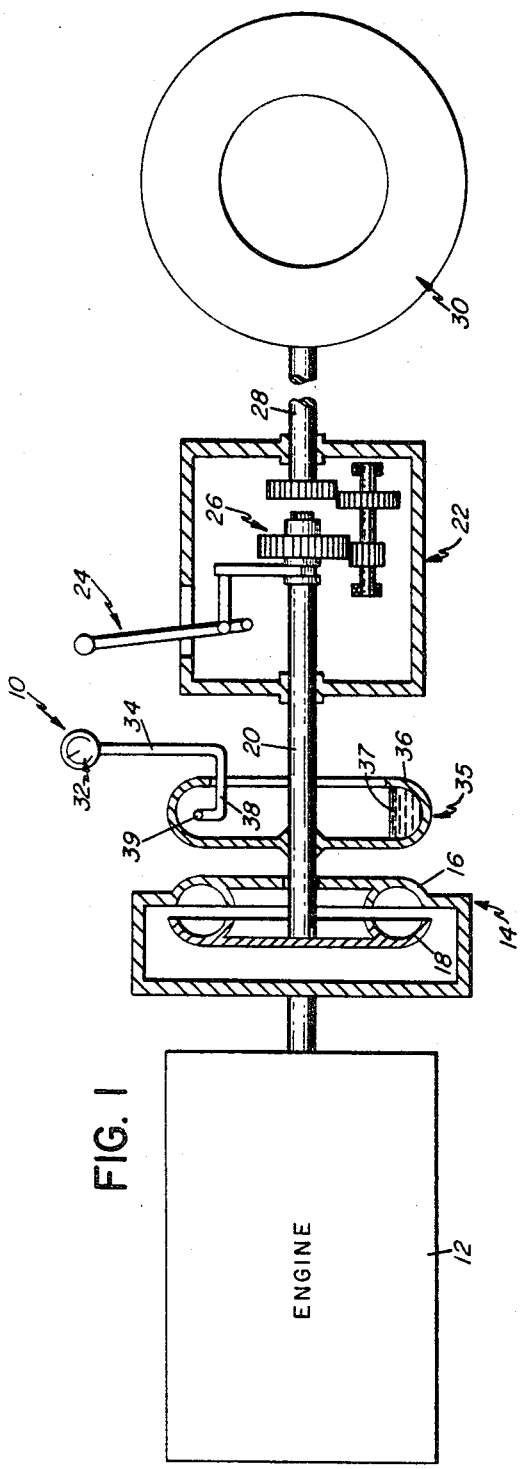
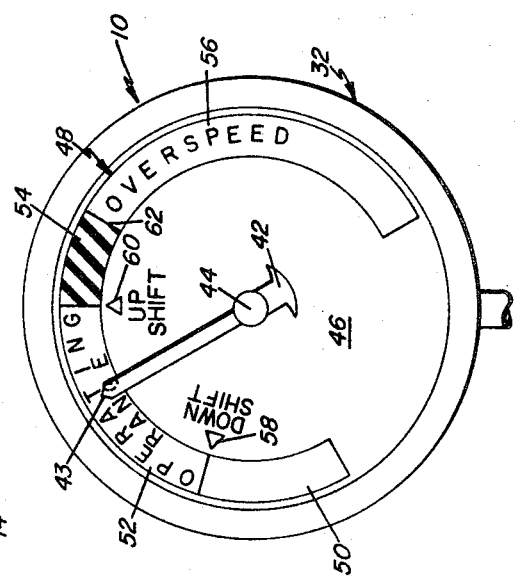
INVENTOR:
ROBERT T. KRUMTINGER
BY: BURNS, DOANE, BENEDICT, SWECKER
& MATHIS
ATTORNEY

United States Patent Office 3,399,577
Patented Sept. 3, 1968

3,399,577
TRANSMISSION SHIFT INDICATOR
Robert T. Krumtinger, Peoria, Ill., assignor to Westinghouse Air Brake Company, Pittsburgh, Pa., a corporation of Pennsylvania
Filed Jan. 12, 1967, Ser. No. 608,778
6 Claims. (Cl. 74—15.84)

ABSTRACT OF THE DISCLOSURE

A transmission shift indicator responsive to engine driven torque converter speed, the indicator being calibrated in accordance with a multiple gear ratio transmission for directly indicating the need or proper time for shifting the transmission. A fluid-containing centrifugal device is drivingly connected to the torque converter output shaft and a pressure responsive, pitot tube gage is associated with the centrifugal device. The gage is provided with first and second indicator means including movable means movable in accordance with torque converter speed for indicating the need or proper time for shifting the transmission to lower or higher gear ratios, respectively.

Field of invention

This invention relates to indicators and, more particularly, to vehicle indicators for indicating the need or proper time for shifting a multiple gear ratio transmission.

Description of the prior art

Heretofore engine driven vehicles have been equipped with tachometers or the like for indicating engine speed in revolutions per minute. While such devices supply needed information for operation of the engine per se at efficient speeds, they provide no direct or accurate information as to the need or optimum time for shifting the vehicle transmission. Such information is particularly important for vehicles equipped with torque converters and a multiple gear ratio transmission to minimize operation of the torque converter at heat provoking "stall" speeds, which are dependent upon torque converter design. However, securing such information in this environment is sometimes complicated by the fact that, under certain conditions, engine and torque converter output shaft speeds may not be equal because of torque converter slippage in a stall speed range. Further, to permit a smooth shift from one gear ratio to another, the transmission gears must be rotating at a proper speed during shifting to avoid gnashing, grinding or backlash of the gears. It has been suggested to associate such tachometer devices with ground speed measuring gages, the reading of which may be compared by an operator to be informed of the need for shifting the vehicle transmission. However, although these and other prior art devices have been satisfactory in some respects, they are complicated, expensive, sometimes inaccurate or necessitate mental gymnastics to inform an operator of the optimum time for shifting the transmission to a higher or lower gear ratio.

Summary of the invention

Accordingly, it is an object of this invention to provide a transmission shift indicator that minimizes or avoids the problems discussed above.

In achieving this general object and others, as will appear hereinafter, the present invention provides a transmission shift indicator adapted for use with a power plant and drive assembly including a multiple gear ratio transmission, said indicator comprising means movable in accordance with drive assembly speeds and scale means directly cooperating with said movable means, the scale means calibrated in accordance with multiple gear ratio transmission terminology and including first graphic means indicating an optimum time for shifting the transmission to a lower gear ratio and second graphic means indicating the optimum time for shifting the transmission to a higher gear ratio.

Of particular significance in a drive assembly including a torque converter is the aspect of the present invention wherein the indicator is part of a system which includes a fluid-containing centrifugal means drivingly connected to the torque converter output shaft. A pitot tube is disposed in the centrifugal means and is connected to actuate a pointer movable relative to the scale means.

Brief description of the drawings

FIGURE 1 is a schematic view of a transmission shift indicator embodying the present invention and installed in a conventional vehicle power plant and drive assembly; and FIGURE 2 is a schematic view, on an enlarged scale, of a face plate portion of the transmission shift indicator shown in FIGURE 1.

Description of the preferred embodiment

Referring in more detail to FIGURE 1 of the drawings, a transmission shift indicator 10 made according to the present invention is shown installed in a conventional vehicle power train. The power train comprises an internal combustion engine 12 drivingly connected to a hydraulic torque converter 14. The torque converter 14 is of a conventional type and includes an impeller or pump 16 drivingly connected to the engine 12 and a turbine 18. Fixedly connected to the turbine 18 is a torque converter tail shaft or output shaft 20, the rear end of which drivingly engages a multiple gear ratio transmission 22 including a gear selector 24 and a plurality of sliding various drive ratio gears 26 of a conventional type. A vehicle drive shaft 28 connects the transmission 22 to the vehicle drive wheels 30 in a conventional manner.

The transmission shift indicator 10 comprises a pressure responsive gage 32 which, by virtue of a fluid conduit 34, is placed in fluid communication with the interior of a fluid-containing centrifugal device 35 mounted on the torque converter tail shaft 20 between the torque converter 14 and the transmission 22. The centrifugal device includes a housing 36 fixed to the tail shaft 20 which contains a quantity of fluid such as oil 37. An inner end of the conduit 34 projects into the housing 36 and is provided with an impact or pitot tube portion 38, the orifice 39 of which faces and is in the path of on-coming fluid 37 upon rotation of the centrifugal device 35. Moving fluid impacting against the pitot tube generates a fluid pressure in the tube which is proportional to fluid velocity.

Referring to FIGURE 2 of the drawings, the pressure responsive gage 32 includes a pivotal pointer 42 having a pointer arrow 43 on the outer end thereof adapted to be pivoted about a pivot axis 44 by a conventional diaphragm (not shown) in accordance with the pressure generated in the pitot tube 38 by the moving fluid 37. The gage 32 further includes a face plate 46, the calibration of which is of particular significance.

Included on the face plate 46 of the gage 32 so as to directly cooperate with the pointer 42 is a generally arcuate scale 48, including first, second, third, and fourth scale portions or sectors, 50, 52, 54 and 56, respectively. The first sector 50 encompasses a lugging range of torque converter tail shaft rotation speeds from zero to a point 58 at which the transmission 22 should be shifted to a lower gear ratio for reasons discussed more fully hereinafter. The second sector 52 encompasses a desired operating range of torque converter tail shaft speeds from the point 58 to a point 60 at which the transmission 22 may conveniently be shifted to a higher gear ratio. The third sector 54 encompasses the up-shifting range which extends from the position 60 to a point 62 which establishes the maximum desirable tail shaft speed for shifting the gears of the transmission 22 without incurring gnashing, grinding, or backlash. The fourth sector 56 encompasses an overspeed range which extends from the position 62 to the maximum likely tail shaft speed.

*Operation*

With the vehicle engine not running, the pointer arrow 43 is in the rest position adjacent to the lower extremity of the first sector 50 of the scale 48. With the engine running and the vehicle starting to move, the point arrow 43 moves in a clockwise direction about the scale 48 to a point depending upon tail shaft speed. For optimum engine and torque converter performance, it is advisable to maintain the vehicle speed so that the pointer arrow 43 is within the second sector 52 or operating range between the points 58 and 60. When vehicle load or travel resistance increases substantially, the speed of tail shaft 20 will be reduced and the pointer will move in a counterclockwise direction. When the pointer arrow 43 reaches point 58 and starts to enter the lugging range, the transmission 22 should be shifted to a lower gear ratio. If the transmission is not down-shifted, the torque converter may be detrimentally affected by operation in a torque converter stall speed range wherein excessive slippage occurs between the impeller and turbine and heat is generated in the converter fluid. At this point it should be noted that indicator 10 responds to torque converter tail shaft speed, not merely engine r.p.m. which may be different from tail shaft speed, and substantially so when the torque converter enters a stall speed range.

Conversely, when the vehicle encounters a reduced load or travel resistance, the pointer arrow 43 will move in a clockwise direction. When the pointer arrow reaches the point 60, the transmission 22 may be shifted to a higher gear ratio. The third sector 54 establishes the range of tail shaft speeds in which the transmission may be shifted without encountering substantial gnashing, grinding, or blacklash of the gears. If the vehicle speed is permitted to further increase, the pointer arrow 43 will be moved past the line 62 in a clockwise direction into the overspeed range, visually indicating that vehicle speed should be decreased by operation of the vehicle brakes or hydraulic retarder, or simply diminished throttle. Of course the transmission should not be up-shifted during operation wherein the pointer arrow 43 is in the fourth sector, to avoid possible gear damage.

Of particular significance is the aspect of the present invention wherein a vehicle operator may be directly informed of the need or optimum time for shifting transmission gear ratios without resorting to mental gymnastics or reliance upon expensive comparison devices. Further, the fact that the centrifugal device 35 is drivingly conected to the tail shaft 20 of the torque converter 14, as opposed to an arrangement wherein a speed indiacting means is driven on the engine side of the converter, is noteworthy in that the instant arrangement enhances accuracy by elimination of errors induced by slippage between the torque converter impeller and turbine and the like. Still further, by utilization of th fluid-containing centrifugal device 35 and the pressure responsive pitot tube gage 32, a fluid pressure responsive indicator is provided that is particularly accurate in the environment of a fluid coupling or torque converter in that both the indicator and coupling or converter are likewise fluid motivated, and conditions affecting one affect the other.

While the invention has been described with reference to being a single embodiment, it will be apparent to those skilled in the art that additions, deletions, modifications, substitutions and other changes in this specifically described and illustrated embodiment may be made within the purview of the appended claims.

What is claimed is:

1. In combination, a pressure responsive indicator, a power plant, a torque converter including an impeller drivingly conected to said power plant, a turibne rotatably mounted relative to said impeller but cooperating therewith to provide a fluid drive, said turbine including an output shaft, a multiple gear ratio transmission drivingly connected to said output shaft, centirfugal means drivingly connected with the output shaft to generate a dynamic fluid pressure which varies as shaft speed varies, and fluid pressure conduit means connecting said indicator and said centirfugal means to indicate the speed of the output shaft as a function of said fluid pressure.

2. The combination according to claim 1 wherein said indicator includes means movable in accordance with the speed of said output shaft, and first and second graphic means directly cooperating with said movable means for directly indicating the optimum time for shifting said transmission to a lower or hgher gear ratio, respectively.

3. The combination according to claim 2 and pitot tube means positioned in said centrifugal device.

4. The combination according to claim 3 wherein said indicator comprises a scale having four sectors, one for each of output shaft lugging, desired operating, up-shifting, or overspeed conditions.

5. In a vehicle having at least one drive wheel, a power plant, a drive assembly connecting the power plant with said drive wheel and including a multiple gear ratio transmission and a fluid-containing centrifugal device, pitot tube means in said centrifugal device and responsive to dynamic fluid pressure therein, a transmission shift indicator comprising means movable in response to pressure in the pitot tube means and having a fluid pressure connection therewith, and scale means cooperating with said movable means, the scale means calibrated in multiple gear ratio transmission terminology and including first graphic means directly indicating an optimum time for shifting the transmission to a lower gear ratio and second graphic means directly indicating an optimum time for shifting the transmisson to a higher gear ratio.

6. In a vehicle as in claim 5, the scale means including other visual means indicating a drive assembly overspeed condition.

References Cited
UNITED STATES PATENTS

| | | | |
|---|---|---|---|
| 1,386,925 | 8/1921 | Constantinesco | 73—502 |
| 2,315,019 | 3/1943 | Samulson | 73—523 X |
| 2,529,129 | 11/1950 | Blair | 74—731 |
| 2,776,572 | 1/1957 | Walter | 74—15.2 X |
| 2,949,047 | 8/1960 | Burckhardt | 74—731 X |
| 3,007,351 | 11/1961 | Hilpert | 74—731 X |
| 3,207,182 | 9/1965 | Edmunds. | |
| 3,039,315 | 6/1962 | Zeek et al. | 73—502 X |

FRED C. MATTERN, Jr., *Primary Examiner.*

LEONARD H. GERIN, *Assistant Examiner.*

UNITED STATES PATENT OFFICE
CERTIFICATE OF CORRECTION

Patent No. 3,399,577                                                            September 3, 1968

Robert T. Krumtinger

It is certified that error appears in the above identified patent and that said Letters Patent are hereby corrected as shown below:

Column 3, line 4, "position" should read -- point --; same line 4, "point should read -- position --; line 15, "point" should read -- pointer --; line 5 "conected" should read -- connected --; line 59, "indiacting" should read -- indicating --; line 64, "th" should read -- the --. Column 4, line 13, "conected" should read -- connected --; same line 13, "turibne" should read -- turbine --; lines 17 and 21, "centirfugal", each occurrence, should read -- centrifugal --; line 28, "hgher" should read -- higher --.

Signed and sealed this 10th day of March 1970.

(SEAL)
Attest:

Edward M. Fletcher, Jr.                                      WILLIAM E. SCHUYLER, JR.

Attesting Officer                                                      Commissioner of Patents